US012574069B2

(12) United States Patent
Chen et al.

(10) Patent No.: US 12,574,069 B2
(45) Date of Patent: Mar. 10, 2026

(54) METHOD FOR WIRELESS CHANNEL FREQUENCY HOPPING SYNCHRONIZATION IN PLC-RF INTEGRATED NETWORK

(71) Applicant: Hangzhou Lianxintong Semiconductor Co., Ltd., Hangzhou City (CN)

(72) Inventors: Ying-Yu Chen, Zhubei City (TW); Yu-Liang Tseng, Zhubei City (TW); Chien-Tse Yu, Zhubei City (TW)

(73) Assignee: HANGZHOU LIANXINTONG SEMICONDUCTOR CO., LTD., Hangzhou City (CN)

( * ) Notice: Subject to any disclaimer, the term of this patent is extended or adjusted under 35 U.S.C. 154(b) by 0 days.

(21) Appl. No.: 18/715,419

(22) PCT Filed: Dec. 1, 2021

(86) PCT No.: PCT/CN2021/134816
§ 371 (c)(1),
(2) Date: May 31, 2024

(87) PCT Pub. No.: WO2023/097563
PCT Pub. Date: Jun. 8, 2023

(65) Prior Publication Data
US 2025/0030450 A1 Jan. 23, 2025

(51) Int. Cl.
*H04B 1/00* (2006.01)
*H04B 1/713* (2011.01)
*H04B 3/54* (2006.01)

(52) U.S. Cl.
CPC .............. *H04B 1/713* (2013.01); *H04B 3/54* (2013.01)

(58) Field of Classification Search
CPC ... H04L 5/0044; H04L 5/0012; H04L 1/0071; H04B 3/54; H04B 1/7136; H04B 1/713;
(Continued)

(56) References Cited

U.S. PATENT DOCUMENTS

| | | | |
|---|---|---|---|
| 10,833,838 B1 | 11/2020 | Descamps et al. | |
| 2008/0267259 A1* | 10/2008 | Budampati | H04B 1/7156 375/E1.037 |

(Continued)

FOREIGN PATENT DOCUMENTS

| | | |
|---|---|---|
| CN | 103155482 A | 6/2013 |
| CN | 103703749 A | 4/2014 |

(Continued)

*Primary Examiner* — Khai Tran
(74) *Attorney, Agent, or Firm* — MUNCY, GEISSLER, OLDS & LOWE, P.C.

(57) ABSTRACT

A method for wireless channel frequency hopping synchronization in a PLC-RF integrated network having a first node, a second node, at least one PLC media and a RF media includes one of following characteristics: the first node uses the PLC media to transmit first frequency hopping data, and the second node receives the first frequency hopping data and then uses the first frequency hopping data to transmit or receive a packet on the RF media; the first node uses the PLC media to transmit second frequency hopping data, and the second node receives the second frequency hopping data and then transmits the second frequency hopping data on the PLC media; and the first node uses the RF media to transmit third frequency hopping data, and the second node receives the third frequency hopping data and then transmits the third frequency hopping data on the PLC media.

12 Claims, 9 Drawing Sheets

(58) Field of Classification Search
CPC .. H04B 1/7156; H04W 5/0012; H04W 16/14;
H04W 72/0446
USPC .......................................... 373/133; 375/133
See application file for complete search history.

(56) References Cited

U.S. PATENT DOCUMENTS

| | | | |
|---|---|---|---|
| 2009/0168846 A1 | 7/2009 | Filippo, III et al. | |
| 2015/0023363 A1 | 1/2015 | Hui et al. | |
| 2019/0238177 A1* | 8/2019 | Liu ........................ | H04B 1/713 |
| 2019/0364609 A1* | 11/2019 | Wang .................... | H04B 1/713 |
| 2020/0204327 A1* | 6/2020 | Jia ...................... | H04W 72/0453 |
| 2020/0383144 A1* | 12/2020 | Sun ...................... | H04L 5/1469 |

FOREIGN PATENT DOCUMENTS

| | | | |
|---|---|---|---|
| CN | 103703844 A | 4/2014 | |
| CN | 204836601 U | 12/2015 | |
| CN | 109194366 A | 1/2019 | |
| CN | 112787790 A | 5/2021 | |
| TW | 200929906 A | 7/2009 | |

* cited by examiner

200

| MHR | Header IEs | Payload IEs | MAC Payload | MFR |
|---|---|---|---|---|

METHOD FOR WIRELESS CHANNEL FREQUENCY HOPPING SYNCHRONIZATION IN PLC-RF INTEGRATED NETWORK

FIELD OF THE INVENTION

The invention relates to a method for channel frequency hopping synchronization, and more particularly to a method for channel frequency hopping synchronization in an integrated network of power line communication (hereinafter referred to as PLC) and radio frequency (hereinafter referred to as RF).

DESCRIPTION OF RELATED ART

In a frequency hopping transmission mechanism of an existing RF network, a node changes its listening channel at a regular interval. If a transmitting end wants to transmit a packet to a receiving end, then the transmitting end firstly estimates a time point when the packet actually starts to be sent to determine the listening channel of the receiving end, and switches to the channel for transmission. Please refer to FIG. 1. FIG. 1 shows the frequency hopping timing of the receiving end recognized by the transmitting end and the actual frequency hopping timing of the receiving end, wherein the timing S1 represents the frequency hopping timing of the receiving end recognized by the transmitting end, and the timing S2 represents the actual frequency hopping timing of the receiving end. The arrow R represents that the receiving end transmits the packet, including the frequency hopping data of the receiving end, to the transmitting end at the last time. The transmitting end can update the frequency hopping timing of the receiving end recognized thereby after receiving the frequency hopping data. The arrow T represents that the transmitting end actually transmits a packet, which also includes the frequency hopping data of the transmitting end so that the receiving end can update the frequency hopping timing of the transmitting end recognized thereby, to the receiving end on the channel Chan2.

Information transmission between the transmitting end and the receiving end may not be performed temporarily due to the poor signal quality of the RF path. As the interrupt time accumulates, the mis-alignment condition gradually occurs for the frequency hopping timing of the receiving end recognized by the transmitting end, as shown in FIG. 2. FIG. 2 shows the influence caused by the gradually expanded error of the frequency hopping timing of the receiving end recognized by the transmitting end (timing S1). The transmitting end transmits a packet to the receiving end at the arrow T on the channel Chan8. At this time, the receiving end has been on the channel Chan4 according to its frequency hopping timing, so the receiving end cannot successfully receive this packet.

Similarly, the channel synchronization issue present in the conventional RF network may also be present in a PLC-RF integrated network. In the PLC-RF integrated network, the RF communications between two nodes may experience temporary interruptions. For example, the interruptions may occur due to the temporary external interference, or obstruction, and the like. Under this circumstance, although the PLC media is another medium that can be used for communication, when the RF media communication resumes, the RF frequency hopping timings recognized by the two nodes may significantly different from those of the two nodes. Additional control information transmission between the two nodes on the RF media is needed, so that the frequency hopping timings of the other parties can be re-synchronized. This requires additional delay and may cause routing changes so that the network becomes unstable.

SUMMARY OF THE INVENTION

The invention is proposed to solve the channel mismatch problem caused, during RF frequency hopping, by the too long RF communication interruption period in a PLC-RF integrated network. The invention can also enable multiple nodes to have consistent broadcast frequency hopping timings in the PLC-RF integrated network.

The invention discloses a method for wireless channel frequency hopping synchronization in the PLC-RF integrated network. One node may transmit, on a PLC media, frequency hopping data to another receiving node, and the receiving node uses the frequency hopping data to transmit a packet on the RF media; the node may transmit, on the PLC media, the frequency hopping data to another receiving node, and the receiving node uses the frequency hopping data to transmit the frequency hopping data on the RF media or the PLC media; the node may transmit, on the PLC media, the frequency hopping data to another receiving node, and the receiving node uses the frequency hopping data to receive the packet on the RF media; and the node may receive the frequency hopping data on the RF media, and use the frequency hopping data to transmit the frequency hopping data on the PLC media.

The invention discloses an embodiment, wherein if the node is a node having at least one PLC transceiver, then the node includes: a shared MAC layer, which includes the frequency hopping data in the packet to be transmitted, and analyzes the frequency hopping data transmitted by another node; and a frequency hopping data updating unit for updating the frequency hopping data to be transmitted by the node; wherein if the node concurrently includes the PLC transceiver and an RF transceiver, then the node further includes a media selector for selecting to use the PLC media to transmit the frequency hopping data, or use the RF media to transmit the frequency hopping data, or selecting to use both of the PLC media and the RF media to respectively transmit the frequency hopping data.

BRIEF DESCRIPTION OF DRAWINGS

In order to explain the technical solutions in the embodiments of the invention more clearly, the drawings needed in the description of the embodiments will be briefly introduced below. The drawings in the following description are only directed to some embodiments of the invention. Those of ordinary skill in the art may also obtain other drawings according to on these drawings without exerting creative efforts.

FIG. 6A shows a MAC packet format of IEEE 802.15.4.

FIG. 6B shows a MPDU format of MAC of IEEE 1901.1.

DETAILED DESCRIPTION OF THE INVENTION

In order to make the purpose, technical solutions and advantages of the embodiments of the invention become clearer, the embodiments of the invention will be further described in detail below with reference to the accompanying drawings. Herein, the illustrative embodiments of the invention and the descriptions thereof are used to explain the invention without limiting the invention.

Figure 1:
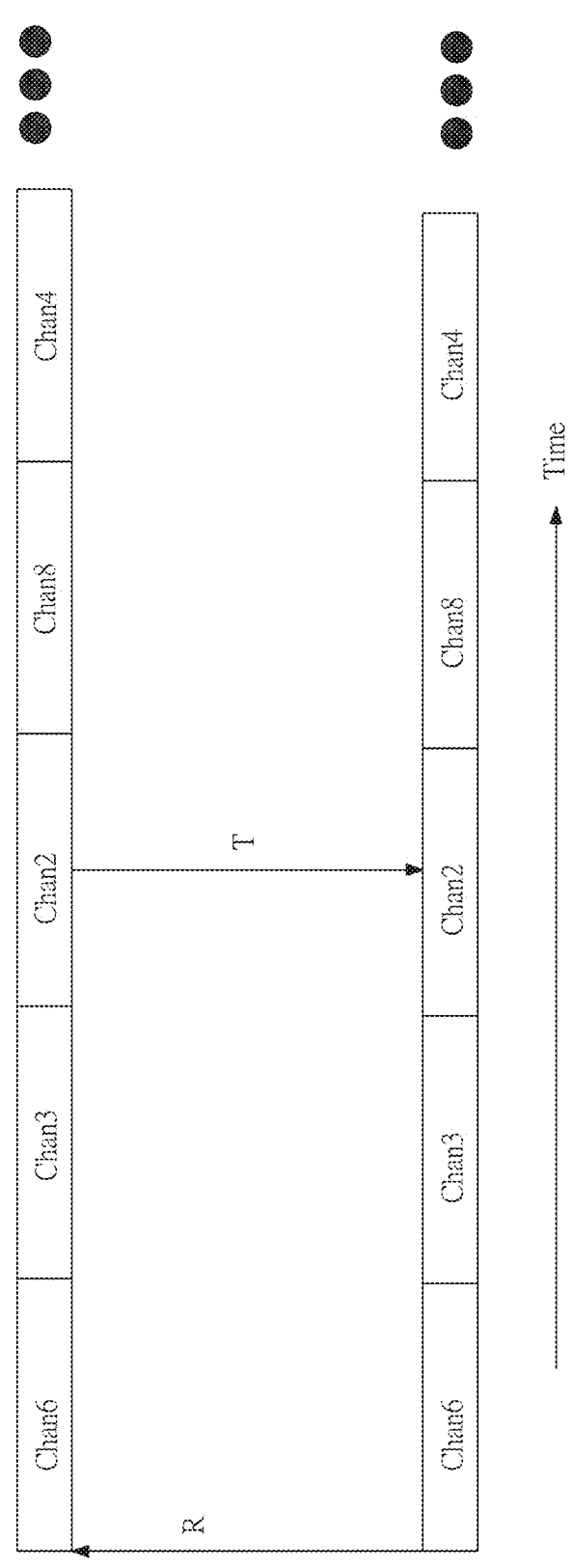
FIG. 1 shows transmitting and receiving conditions of the existing RF frequency hopping network.
Figure 2:
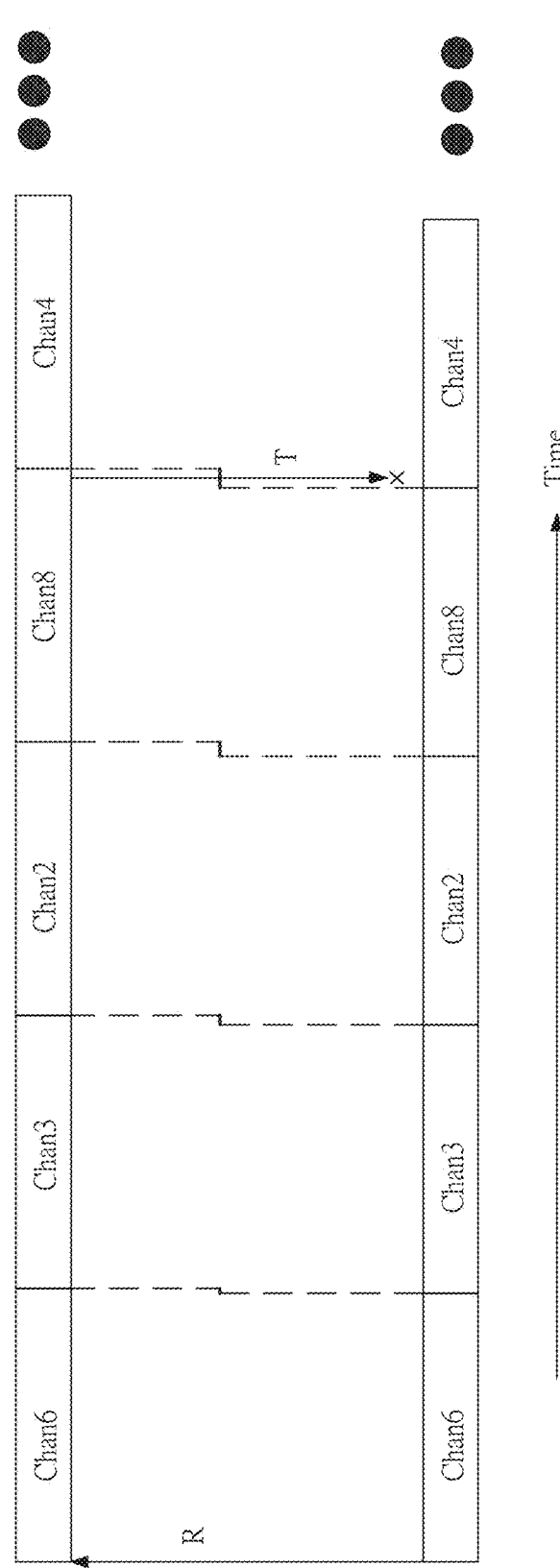
FIG. 2 shows the influence caused by the gradually expanded error of the frequency hopping timing of the receiving end recognized by the transmitting end (timing S1) in FIG. 1.
Figure 3:
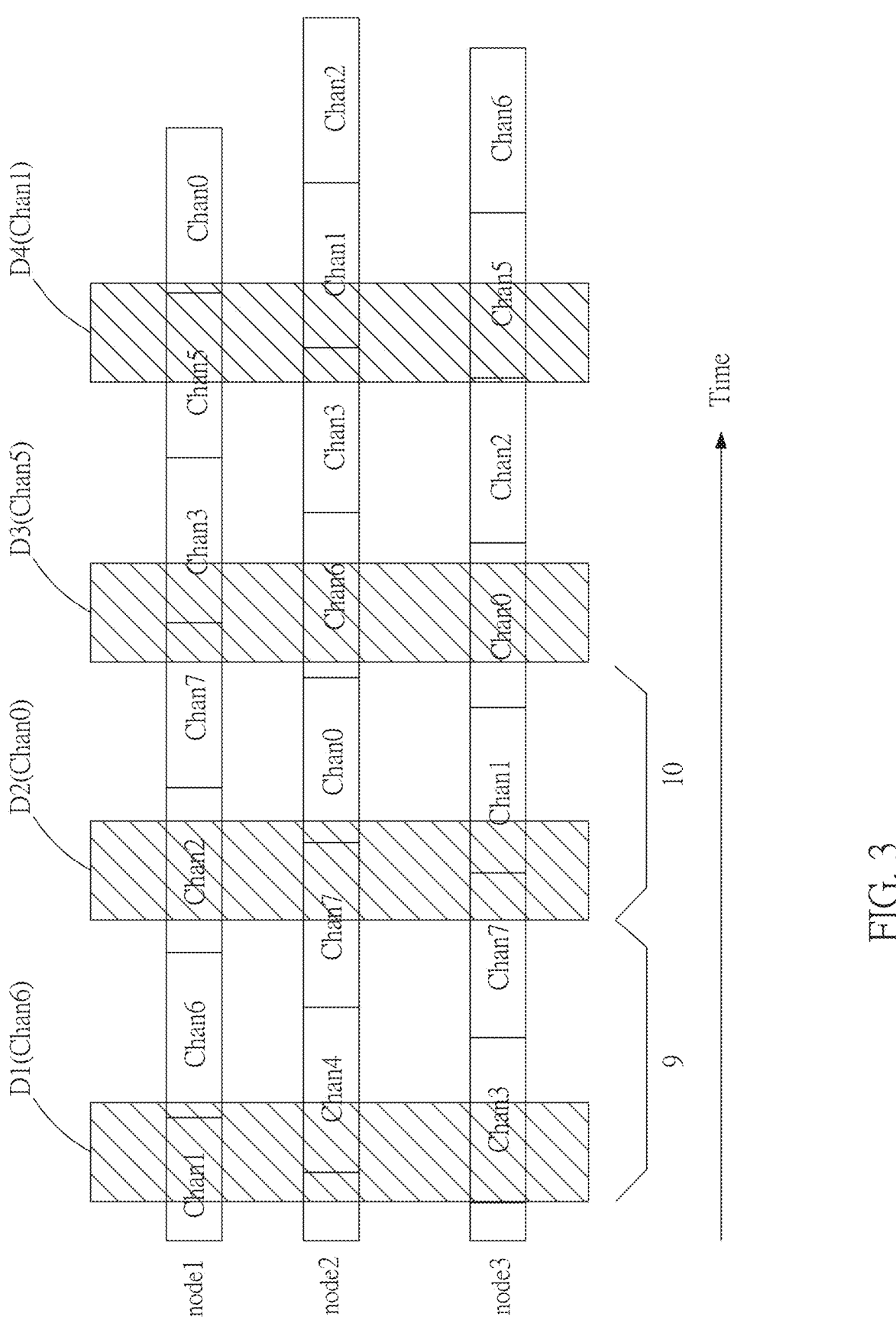
FIG. 3 shows broadcast and unicast frequency hopping timings in the RF frequency hopping network with multiple nodes.

Please refer to FIG. 3. FIG. 3 shows channel frequency hopping timings in an existing RF network having multiple nodes, wherein the channel frequency hopping timings include a unicast frequency hopping timing of each node and a network-wide broadcast frequency hopping timing determined by a root node. When the unicast frequency hopping timing of the node encounters the broadcast frequency hopping timing, the broadcast frequency hopping timing must take precedence. A time interval of each channel in the unicast frequency hopping timing is fixed, and referred to as a unicast dwell interval. Similarly, a time interval of each channel in the broadcast frequency hopping timing is referred to as a broadcast dwell interval.

As shown in FIG. 3, the timeline is split into fixed-length time intervals 9, 10, . . . , referred to as broadcast intervals, and the beginning of each broadcast interval is referred to as the broadcast dwell interval (each of D1 to D4, as shown by the hatched areas) for transceiving broadcast packets. The remaining part of each broadcast interval after the broadcast dwell interval is used for transceiving the unicast packet. Taking the broadcast interval 9 as an example, at the beginning of the broadcast dwell interval D1, the nodes 1 to 3 concurrently switch to the channel Chan6 for monitoring, wherein the broadcast packet, if any, can be transmitted in this broadcast dwell interval D1; and the nodes 1 to 3 immediately and respectively switch to the channels Chan6, Chan4 and Chan3 to monitor the packets immediately after the ending of the broadcast dwell interval D1.

The transmitting end is oriented to the receiving end upon transmitting the unicast packet. That is, the transmitting end switches the channel to the channel monitored by the receiving end to perform the transmission; and the transmitting end can calculate and correct the frequency hopping timing of the receiving end recognized by the transmitting end according to information such as the frequency hopping data previously sent from the receiving end, the last receiving time, the current time and the like. The network-wide broadcast frequency hopping timing is determined by the root node. The child node of the root node synchronizes its broadcast timing after receiving the broadcast frequency hopping data sent from the root node, and subsequently transmits the updated broadcast frequency hopping data so that the child node thereof can perform the synchronization. Analogically, the network-wide nodes have the synchronized broadcast frequency hopping timing.

The frequency hopping data described in the invention is cited from the prior art to illustrate the invention, and is not restricted to the following contents. The frequency hopping data may be the unicast frequency hopping data and the broadcast frequency hopping data. The unicast frequency hopping data includes the size of the unicast dwell interval, or the proportion of the unicast sequence interval. The broadcast frequency hopping data includes the size of the broadcast dwell interval, the size of the broadcast interval, the broadcast time slot number, or the broadcast interval offset, etc. In addition, each of the unicast frequency hopping data and the broadcast frequency hopping data further includes information, such as its individual frequency hopping function, channel planning, channel interval, starting channel, and the like. The frequency hopping data transmitted by the nodes in the embodiments of the invention includes all or a part of the above-mentioned contents in one embodiment.

The invention discloses a method for wireless channel frequency hopping synchronization in a PLC-RF integrated network, wherein the node outputs the frequency hopping data from the selected media according to the selected media, and the node receiving the frequency hopping data performs the subsequent transmitting or receiving using the frequency hopping data.

Figure 4:
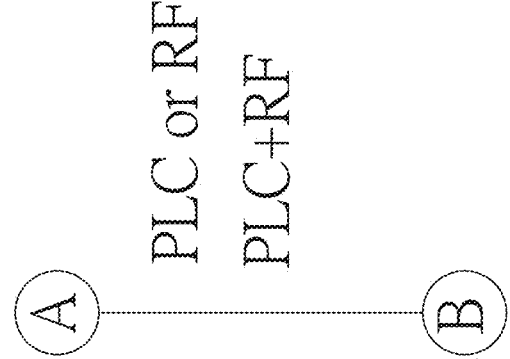
FIG. 4 shows that the invention may also achieve the network-wide synchronized broadcast frequency hopping timing in a PLC-RF integrated network.

Please refer to FIG. 4 for a more detailed explanation. Each of the nodes A and B in FIG. 4 may respectively have the RF transceiver, the PLC transceiver, or both the RF transceiver and the PLC transceiver. The nodes A and B may therefore have different patterns of link types.

If the node A transmits its unicast frequency hopping data to the node B on the PLC media, then the node B can use the unicast frequency hopping data when the RF media is subsequently selected to transmit the packet to the node A.

If the node A transmits the broadcast frequency hopping data on the PLC media and the node B is one of the receiving nodes, then the node B can adjust, according to the broadcast frequency hopping data, its broadcast frequency hopping timing to be used when the packet is subsequently broadcasted and transmitted on the RF media, wherein the packet may include the updated broadcast frequency hopping information.

If the node A transmits the broadcast frequency hopping data on the PLC media, and the node B is one of the receiving nodes, then the node B can subsequently update the broadcast frequency hopping data and transmit the updated broadcast frequency hopping data on the PLC media. In one embodiment, the broadcast frequency hopping data transmitted by the node B is extrapolated according to the broadcast frequency hopping data and processing backoff associated with the PLC media.

If the node A transmits the broadcast frequency hopping data on the PLC media and the node B is one of the receiving nodes, then the node B can use the broadcast frequency hopping data to adjust its broadcast frequency hopping timing to be used to receive the broadcast packet on the RF media.

If the node A transmits the broadcast frequency hopping data on the PLC media and the node B is one of the receiving nodes, then the node B can subsequently update the broadcast frequency hopping data, and transmit the updated broadcast frequency hopping data on the PLC media.

The node A transmits the broadcast frequency hopping data on the RF media and the node B is one of the receiving nodes, and the node B can subsequently update the broadcast frequency hopping data, and transmit the updated broadcast frequency hopping data on the PLC media. In one embodiment, the broadcast frequency hopping data transmitted by the node B is extrapolated according to the broadcast frequency hopping data and the processing backoff associated with the PLC media.

Figure 5A:
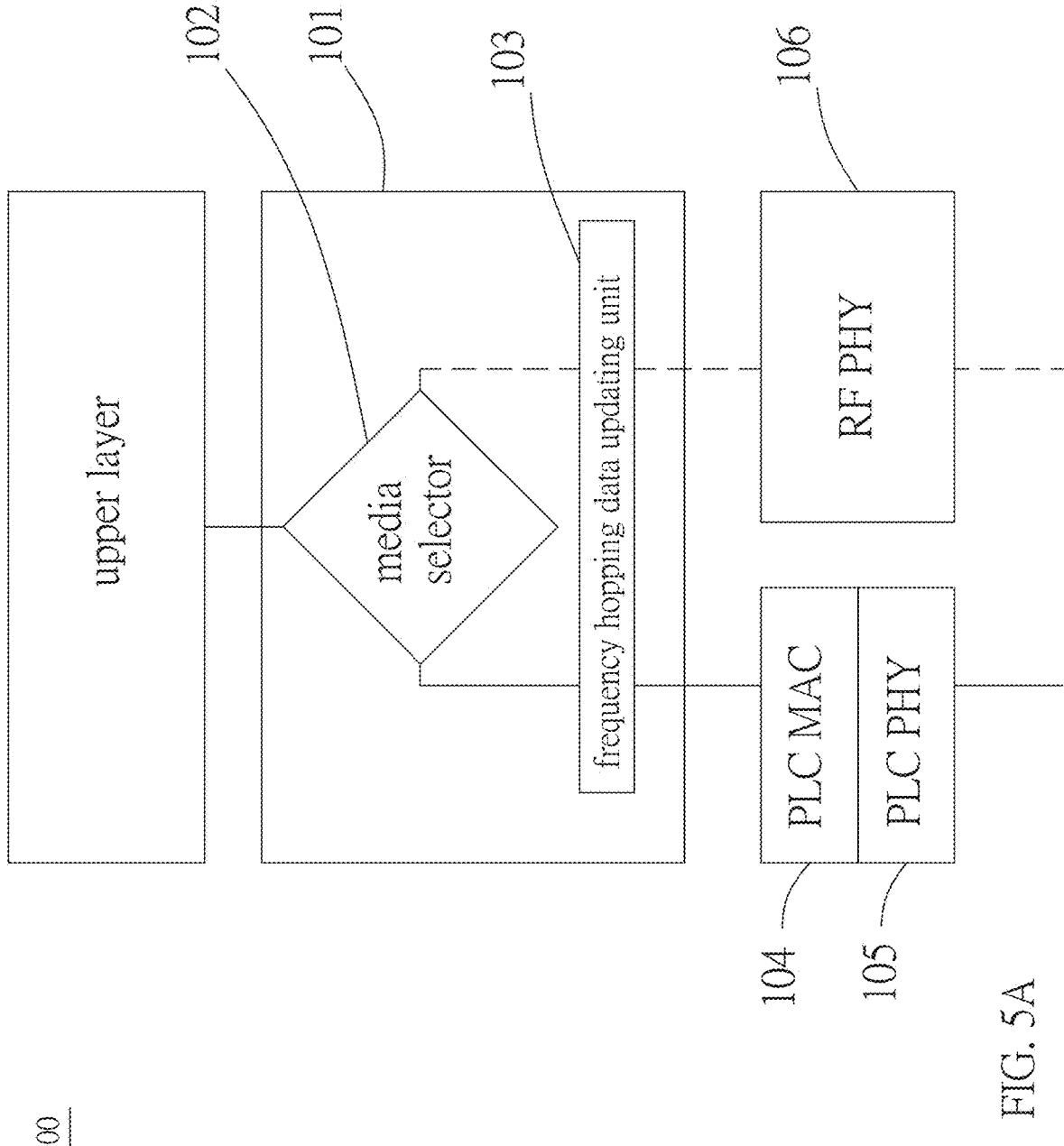
FIG. 5A is a schematic view showing a node in a channel frequency hopping synchronization device 100 in the PLC-RF integrated network of the invention.

Please refer to FIG. 5A. FIG. 5A shows a device 100 in node according to an embodiment of the invention. In this embodiment, the device 100 in node is a device having PLC and RF transceivers and includes: a media access control (hereinafter referred to as MAC) layer 101, a media selector 102, a frequency hopping data updating unit 103, a PLC MAC layer 104, a PLC PHY layer 105 and a RF PHY layer 106, wherein the MAC layer 101 is shared by the PLC media and the RF media.

The media selector 102 selects at least one media for transmitting the frequency hopping data; and the frequency hopping data updating unit 103 is coupled to the media selector 102 and updates the to-be-transmitted frequency hopping data.

In one embodiment, the selection method of the media selector 102 may be implemented in multiple manners. For example, the use of a certain media for transmission may be configured in advance at the node; the use of a certain media for transmission may also be specified by the upper layer; the use of a certain media for transmission may also be performed in the media selector 102, which alternates between PLC and RF according to cycling rules; the use of a certain media for transmission may also be switched to another media after a certain media continuously fails for a certain number of times; and the use of a certain media for transmission may also be selected between unicast or broadcast according to the packet, for example, only one media is selected for transmission at a time if it is unicast, and both the PLC media and the RF media are selected for transmission if it is broadcast.

Figure 6A:
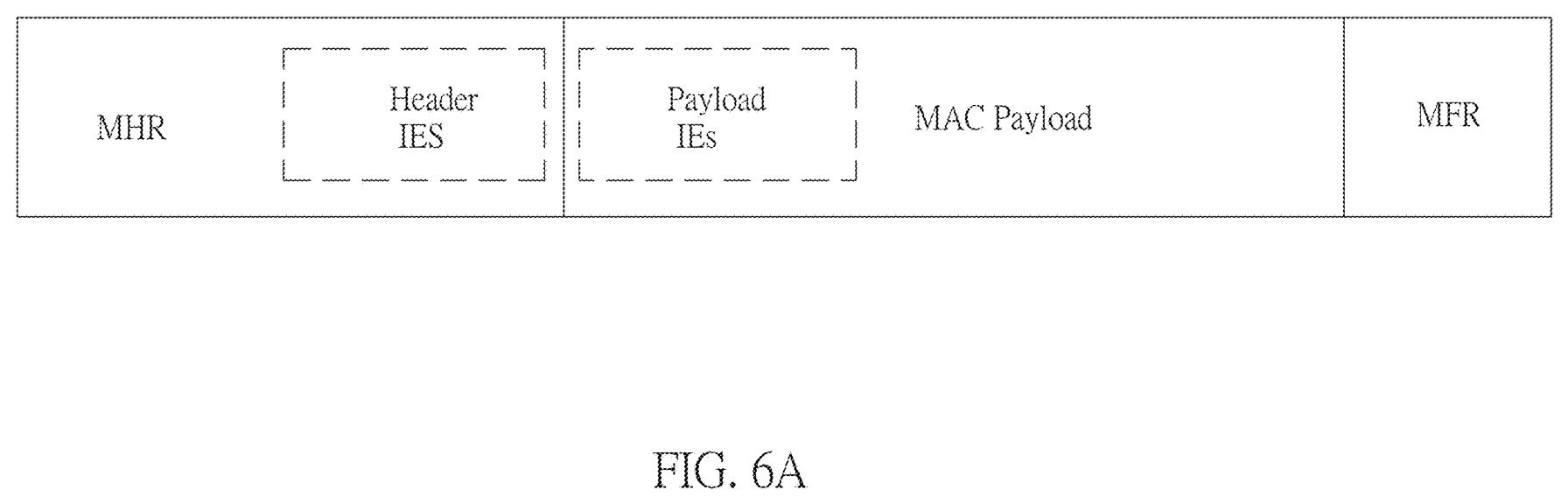

In one embodiment, if the node is a node having only the PLC transceiver, then the device 100 may or may not have media selector 102. In this embodiment, the MAC layer 101 in FIG. 5A is MAC of IEEE 802.15.4, and is shared by the PLC media and the RF media, the packet format thereof is shown in FIG. 6A, and the frequency hopping data may be appended to a header information element (IE) field and a payload information element field. MHR is the frame header (MAC header), MAC Payload is the MAC payload, and MFR is the MAC footer.

Figure 6B:
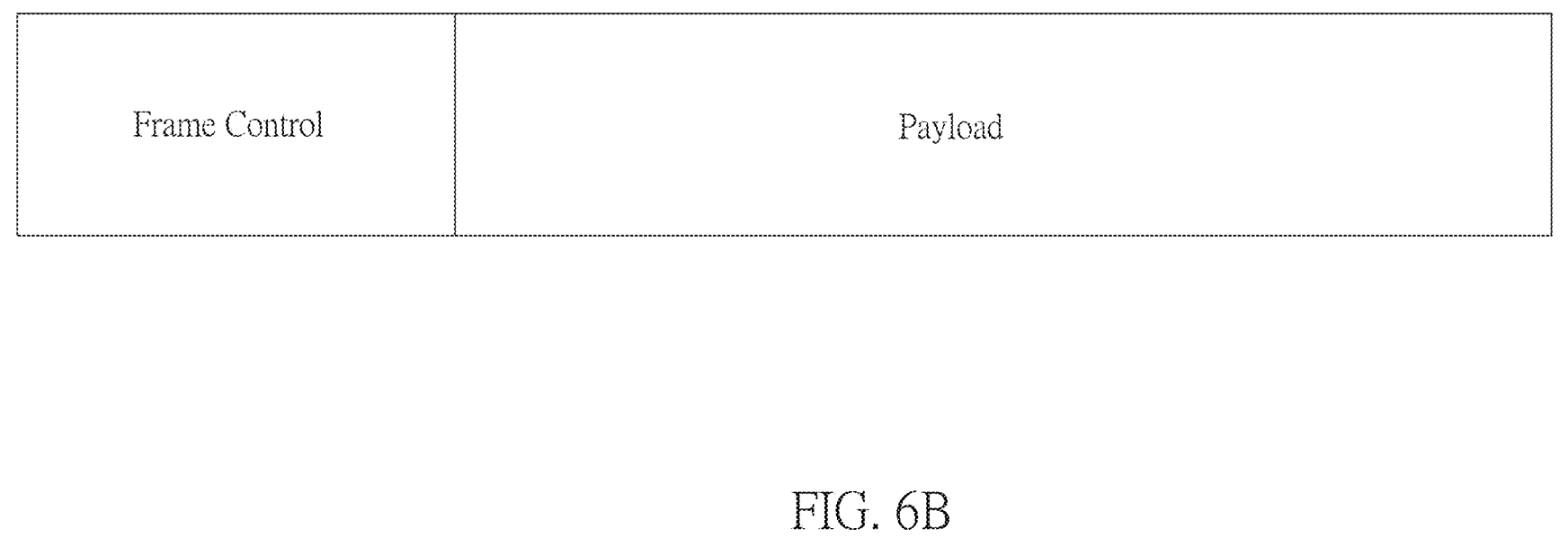

In one embodiment, PLC MAC is MAC of IEEE 1901.1, the format of its MAC protocol data unit MPDU is shown in FIG. 6B and includes frame control and payload, and some functions of the PLC MAC layer 104 need to be simplified and modified, wherein the retransmission mechanism and delay or backoff mechanism are determined by the shared MAC layer 101, so that the frequency hopping data in the packet can be timely updated. In one embodiment, the frame control length is 16 bits, and the payload length is 72/136/264/520 bits.

If the media selected by the media selector 102 is included in the RF media and transmitted, then the frequency hopping data updating unit 103 can update the frequency hopping data in the packet and extrapolate the receiving channel of the transmitting object according to the existing technology. If the media selected by the media selector includes PLC, then the frequency hopping data updating unit 103 needs to estimate the processing time delay required for the packet to pass through the PLC MAC layer 104 and the PLC PHY layer 105 from the above-mentioned time, and the processing time delay required before the packet is actually transmitted out, so that the frequency hopping data in the packet can be correctly updated. If the frequency hopping data includes the unicast frequency hopping data, then the proportion of the unicast sequence interval in the unicast frequency hopping data is calculated according to at least the delay. If the frequency hopping data includes the broadcast frequency hopping data, then the broadcast time slot number and the broadcast interval offset in the broadcast frequency hopping data are calculated according to at least the delay.

It should be noted that, after the processing of the frequency hopping data updating unit 103 ends, the actually accumulated time is found to exceed the delay, originally estimated by the frequency hopping data updating unit 103, by an allowable range in the PLC MAC layer 104 or the PLC PHY layer 105, then the transmission of this packet should be abandoned, and the common MAC layer 101 should be notified for subsequent processing.

In one embodiment, the shared MAC layer 101 has a frequency hopping data outdate judging logic (not shown in the drawing), which inspects whether the frequency hopping data has been or will be outdated in the process before the node sends the frequency hopping data. If the data is outdated or will be outdated, then the node will re-update the frequency hopping data.

Figure 5B:
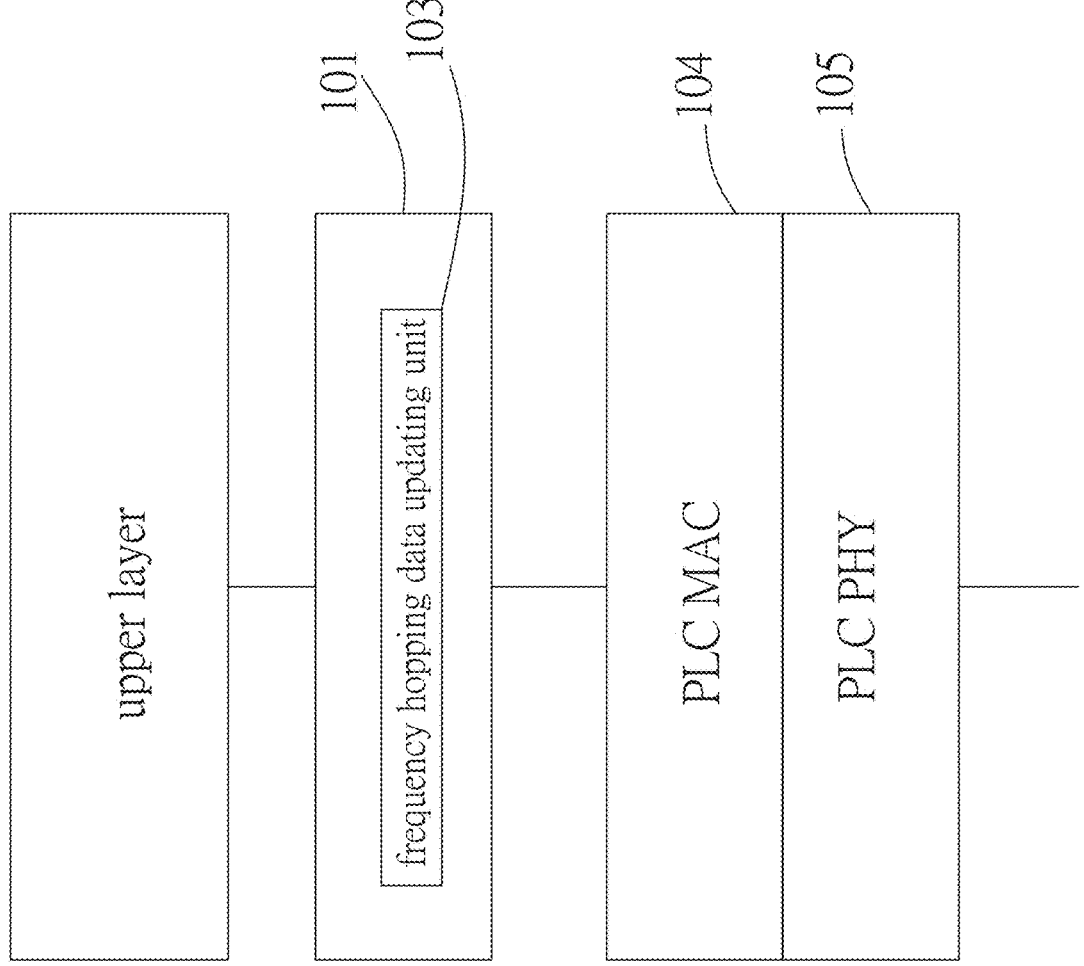
FIG. 5B is a schematic view showing a node device 200 having only a PLC transceiver in the PLC-RF integrated network of the invention.

FIG. 5B shows a node device 200 of the invention having only a PLC transceiver in a PLC-RF integrated network, and differs from FIG. 5A in that this node has no RF PHY layer. In addition, because the node device only has the PLC transceiver, the media selector is not needed. The other operation principles are the same as those mentioned hereinabove, and detailed descriptions thereof will be omitted here.

Figure 7:
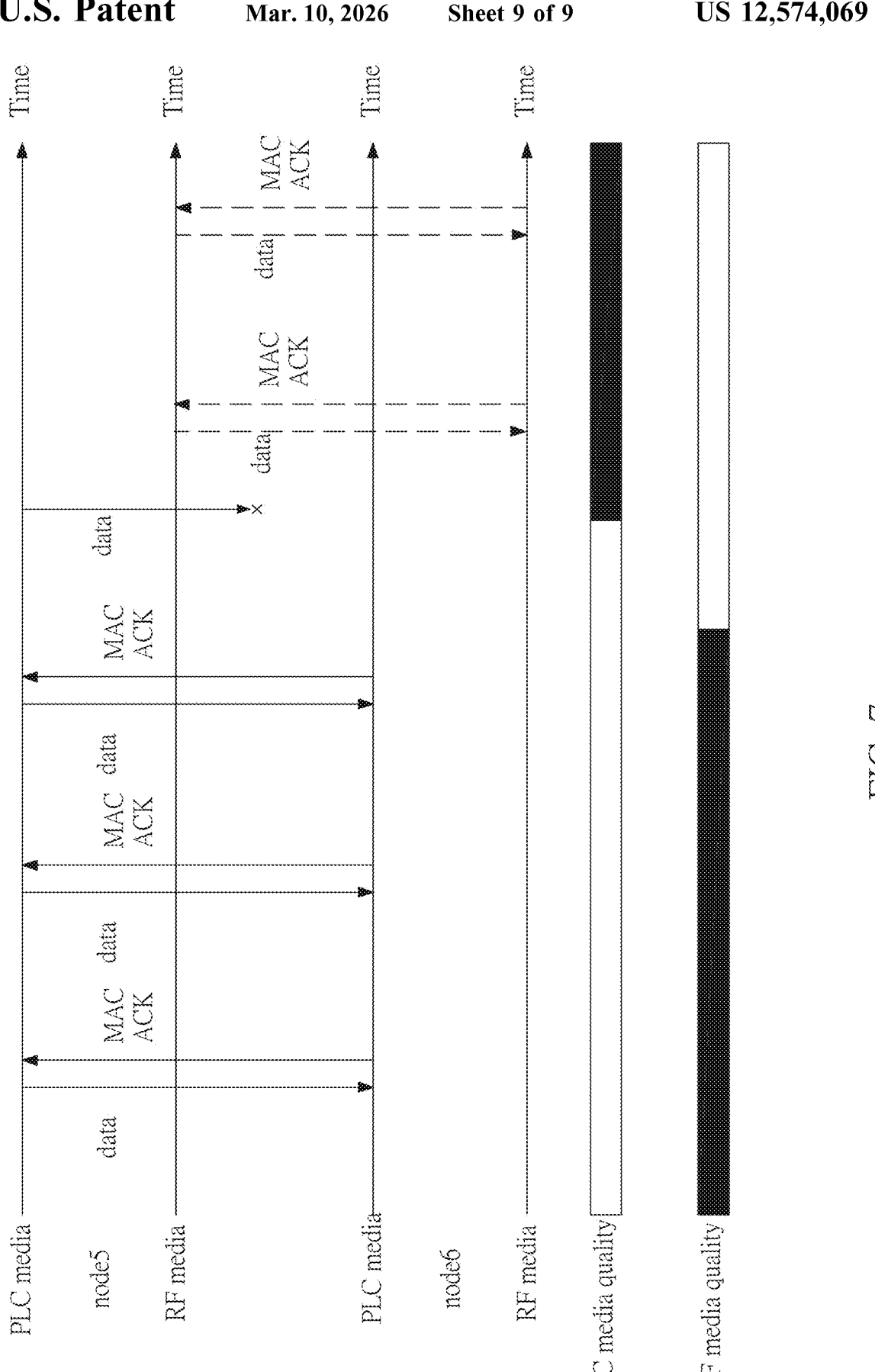
FIG. 7 is a schematic view showing switching from the PLC transmission to the RF transmission using two neighboring nodes of the invention.

Referring to FIG. 7 of this embodiment, at the beginning, the transmission quality of the RF media between the nodes 5 and 6 is poor (the black block represents the lower communication quality), and the transmission quality of the PLC media is good (the white block represents the higher communication quality). At this time, the node 5 selects the PLC media for transmission of a data packet "data" with the node 6, the node 6 also replies MAC confirmation information (hereinafter referred to as MAC ACK) to the node 5 on the PLC after receiving the packet, and the data packet "data" and the MAC ACK both containing the unicast frequency hopping data of the sender so that the receiving end can synchronize with it. After a certain period of time has elapsed, the transmission quality of the RF media becomes good, the transmission quality of the PLC media deteriorates, and the node 5 has not received the MAC ACK of the node 6 after sending the data packet "data". At this time, the node 5 selects to perform data packet transmission using the RF media. Regarding the frequency hopping data of the RF media, the frequency hopping data is continuously exchanged on the PLC media before the communication quality of the PLC media deteriorates. So, the node 5 still retains the frequency hopping timing within the error tolerance of the node 6, thereby allowing the data packet "data" to be received by the node 6. After the node 6 has received the data packet "data," the unicast frequency hopping information thereof can be used to transmit the MAC ACK to the node 5.

The invention can achieve the broadcast frequency hopping timing of the network-wide synchronization in a PLC-RF integrated network. It is assumed that the node A and the node B are two nodes having parent-child node relationships in the network PLC and RF integrated network, wherein the node A is the parent node, the node B is the child node, and the node A and the node B have transceivers with the same media so that the communication therebetween can be performed. If the node A is a node having the broadcast frequency hopping timing synchronized with the root node, then the node B can obtain the broadcast frequency hopping data from the node A and continue to pass it to its child nodes after updating no matter whether the node A and the node B exchange data through RF, PLC or both. Please note that the node A may also be a root node, which has the PLC transceiver and still can initiate a broadcast frequency hopping timing.

The invention claimed is:

1. A method for wireless channel frequency hopping synchronization in a Power Line Communication-Radio Frequency (PLC-RF) integrated network having a first node and a second node, at least one PLC media and a RF media, the method comprising one of following characteristics:

the first node uses the PLC media to transmit first frequency hopping data, and the second node receives the first frequency hopping data and then uses the first frequency hopping data to transmit or receive a packet on the RF media;

the first node uses the PLC media to transmit second frequency hopping data, and the second node receives the second frequency hopping data and then transmits the second frequency hopping data on the PLC media; and the first node uses the RF media to transmit third frequency hopping data, and the second node receives the third frequency hopping data and then transmits the third frequency hopping data on the PLC media.

2. The method for wireless channel frequency hopping synchronization in the PLC-RF integrated network according to claim 1, wherein when the first node uses the PLC media to transmit the first frequency hopping data, the first frequency hopping data is unicast frequency hopping data, and after the second node uses the unicast frequency hopping data to update a frequency hopping timing of the first node recognized by the second node, the second node transmits the packet to the first node on the RF media.

3. The method for wireless channel frequency hopping synchronization in the PLC-RF integrated network according to claim 1, wherein when the first node uses the PLC media to transmit the first frequency hopping data, the first frequency hopping data is broadcast frequency hopping data, and after the second node uses the broadcast frequency hopping data to update a broadcast frequency hopping timing, the second node transmits or receives a broadcast packet on the RF media.

4. The method for wireless channel frequency hopping synchronization in the PLC-RF integrated network according to claim 3, wherein the broadcast packet transmitted by the second node on the RF media comprises the broadcast frequency hopping data, which is updated.

5. The method for wireless channel frequency hopping synchronization in the PLC-RF integrated network according to claim 1, wherein when the first node uses the PLC media to transmit the second frequency hopping data, the second frequency hopping data is broadcast frequency hopping data, and the second node transmits the broadcast frequency hopping data, which is updated, on the PLC media.

6. The method for wireless channel frequency hopping synchronization in the PLC-RF integrated network according to claim 5, wherein the broadcast frequency hopping data, which is updated and transmitted by the second node, is extrapolated according to the second frequency hopping data, which is received, and processing backoff associated with the PLC media.

7. The method for wireless channel frequency hopping synchronization in the PLC-RF integrated network according to claim 1, wherein the third frequency hopping data transmitted by the first node using the RF media is broadcast frequency hopping data, and the second node transmits the broadcast frequency hopping data, which is updated, on the PLC media.

8. The method for wireless channel frequency hopping synchronization in the PLC-RF integrated network according to claim 7, wherein the broadcast frequency hopping data transmitted by the second node is extrapolated according to the third frequency hopping data, which is received, and processing backoff associated with the PLC media.

9. The method for wireless channel frequency hopping synchronization in the PLC-RF integrated network according to claim 1, wherein if each of the first node and the second node is a node having at least one PLC transceiver, then the node comprises:

a shared Media Access Control (MAC) layer, which includes the first frequency hopping data, the second frequency hopping data or the third frequency hopping data in the packet to be transmitted, and analyzes the first frequency hopping data, the second frequency hopping data or the third frequency hopping data transmitted by another node; and a frequency hopping data updating unit for updating the first frequency hopping data, the second frequency hopping data or the third frequency hopping data to be transmitted by the node;

wherein if the node concurrently includes the PLC transceiver and a RF transceiver, then the node further comprises a media selector for selecting to use the PLC media to transmit the first frequency hopping data, the second frequency hopping data or the third frequency hopping data, or to use the RF media to transmit the first frequency hopping data, the second frequency hopping data or the third frequency hopping data, or selecting to use both of the PLC media and the RF media to respectively transmit the first frequency hopping data, the second frequency hopping data or the third frequency hopping data.

10. The method for wireless channel frequency hopping synchronization in the PLC-RF integrated network according to claim 9, wherein the first frequency hopping data, the second frequency hopping data or the third frequency hopping data can be appended, by the shared MAC layer, to a header information element field and a payload information element field of the packet.

11. The method for wireless channel frequency hopping synchronization in the PLC-RF integrated network according to claim 10, wherein the frequency hopping data updating unit needs to estimate a processing time delay of the packet after the first frequency hopping data, the second frequency hopping data or the third frequency hopping data has been updated, and before the packet is actually sent, and thus to correctly update the first frequency hopping data, the second frequency hopping data or the third frequency hopping data in the packet.

12. The method for wireless channel frequency hopping synchronization in the PLC-RF integrated network according to claim 9, wherein the shared MAC layer has a frequency hopping data outdate judging logic, which inspects whether the first frequency hopping data, the second frequency hopping data or the third frequency hopping data has been or will be outdated in a process before the node sends the first frequency hopping data, the second frequency hopping data or the third frequency hopping data, wherein if the first frequency hopping data, the second frequency hopping data or the third frequency hopping data has been or will be outdated, then the node re-updates the first frequency hopping data, the second frequency hopping data or the third frequency hopping data.

* * * * *